United States Patent
Hayman et al.

(10) Patent No.: US 7,388,806 B2
(45) Date of Patent: Jun. 17, 2008

(54) MASS POSITIONING APPARATUS FOR A SEISMIC SENSOR

(75) Inventors: Mark Jonathan Brice Hayman, Dunrobin (CA); Bruce Leigh Townsend, Stittsville (CA); Nicholas Jason Ackerley, Ottawa (CA); Robin Brice Hayman, Dunrobin (CA)

(73) Assignee: Nanometrics Inc. (CA)

( * ) Notice: Subject to any disclaimer, the term of this patent is extended or adjusted under 35 U.S.C. 154(b) by 372 days.

(21) Appl. No.: 11/337,967

(22) Filed: Jan. 23, 2006

(65) Prior Publication Data

US 2006/0225503 A1 Oct. 12, 2006

(30) Foreign Application Priority Data

Jan. 24, 2005 (CA) .................................. 2493826

(51) Int. Cl.
*G01V 13/00* (2006.01)
*G01V 1/00* (2006.01)

(52) U.S. Cl. ....................................................... 367/13
(58) Field of Classification Search .................. 367/13, 367/178; 73/1.85
See application file for complete search history.

(56) References Cited

U.S. PATENT DOCUMENTS 3,713,088 A 1/1973 Lehner
4,280,206 A 7/1981 Guralp
6,363,035 B1 3/2002 Canuteson

FOREIGN PATENT DOCUMENTS

CA 2493826 * 7/2006
CA 2493852 * 7/2006

OTHER PUBLICATIONS

UK Search Report, for International Application No. GB0601350.2, 1 page, Date of Search Jun. 12, 2006.
MJ Usher, IW Buckner and RF Burch, *A miniature wideband horizontal-component feedback seismometer*, Journal of Physics E: Scientific Instruments, 1977, 8 pages, vol. 10, Great Britain.
L. Gary Holcomb, Charles R. Hunt, *An Evaluation of Installation Methods For STS-1 Seismometers*, United States Department of the Interior Geological Survey, Open File Report 92-302, 1992, 37 pages, Albuquerque, New Mexico.
Winifred Hanka, *Which Parameters influence the Very Long Period Performance of a Seismological Station?*, downloaded from http://www.gfz-potsdam.de/geofon/manual/welcome.html, on Feb. 19, 2004, GEOFON Network, 13 pages, Potsdam, Germany.

(Continued)

*Primary Examiner*—Dan Pihulic
(74) *Attorney, Agent, or Firm*—Straub & Pokotylo; Michael P. Straub; Ronald P. Straub

(57) ABSTRACT

A mass positioning apparatus for use with seismic sensors is described. The seismic sensor includes axis mechanics including a pivotable boom with a defined null point. The mass positioning apparatus comprising: adjustment means for positioning the boom at the null point; actuator means for moving the adjustment means; and means for determining a position of the adjustment means relative to an operational range of travel.

18 Claims, 4 Drawing Sheets

OTHER PUBLICATIONS

RV Jones, JCS Richards, *The design and some applications of sensitive capacitance micrometers*, Journal of Physics E: Scientific Instruments, 1973, pp. 589-600, vol. 6, Great Britain.

Erhard Wielandt, *Seismic Sensors and their Calibration*, downloaded from http://www.geophys.uni-stuttgart.de/seismometry/man_html/man_html.html, 28 pages, on Mar. 15, 2000, Stuttgart, Germany.

E. Wielandt, G. Streckeisen, *The leaf-spring seismometer: design and performance*, Bulletin of the Seismological Society of America, Dec. 1982, vol. 72, No. 6, pp. 2349-2367, Eidgenossische Technische Hochshule, Institute fur Geophysik, Zurich, Switzerland.

\* cited by examiner

MASS POSITIONING APPARATUS FOR A SEISMIC SENSOR

CROSS-REFERENCE TO RELATED APPLICATIONS

This application claims priority to Canadian application no. 2,493,826 filed on Jan. 24, 2005, and is related to U.S. patent application Ser. No. 11/337,834, filed on Jan. 23, 2006 titled "SEISMIC SENSOR WITH THERMAL STABILIZATION" identified by U.S. patent application Ser. No. 11/337,804, filed on Jan. 23, 2006, titled "MASS POSITIONING ADJUSTMENT MECHANISM FOR A SEISMIC SENSOR" identified by all of which are hereby expressly incorporated by reference.

FIELD OF THE INVENTION

The present invention relates to the field of seismic sensors and more particularly to mass positioning apparatuses for use with seismic sensors.

BACKGROUND

A broadband seismometer typically requires an adjustable mass positioning apparatus operated by an electrical motor or a manually adjusted screw to position an inertial mass to a measurement null point to compensate for the inertial mass moving from the null point due to environmental changes or mis-calibration. Mass positioning apparatuses can be prone to jamming, and problems can be difficult to diagnose without disassembling the instrument to visually inspect the apparatus.

Mass positioning apparatuses operate within a defined range beyond which no further adjustment is possible, but such traditional apparatuses do not report position information of the apparatus relative to its operational range, and so the operator of the seismic sensor cannot readily know what further range of adjustment is available and whether the instrument is operating with sufficient margin to compensate for future expected environmental changes.

There is a need to provide mass positioning apparatuses that are more reliable, that report position information and other diagnostic information, and that can be realized relatively economically inside the seismic sensor without significantly increasing the volume of the sensor enclosure.

SUMMARY

In accordance with one aspect of the present invention there is provided a mass positioning apparatus for use in a seismic sensor having axis mechanics including a pivotable boom with a defined null point, the apparatus comprising: adjustment means for positioning the boom at the null point; actuator means for moving the adjustment means; and means for determining a position of the adjustment means relative to an operational range of travel.

DETAILED DESCRIPTION

Figure 1:
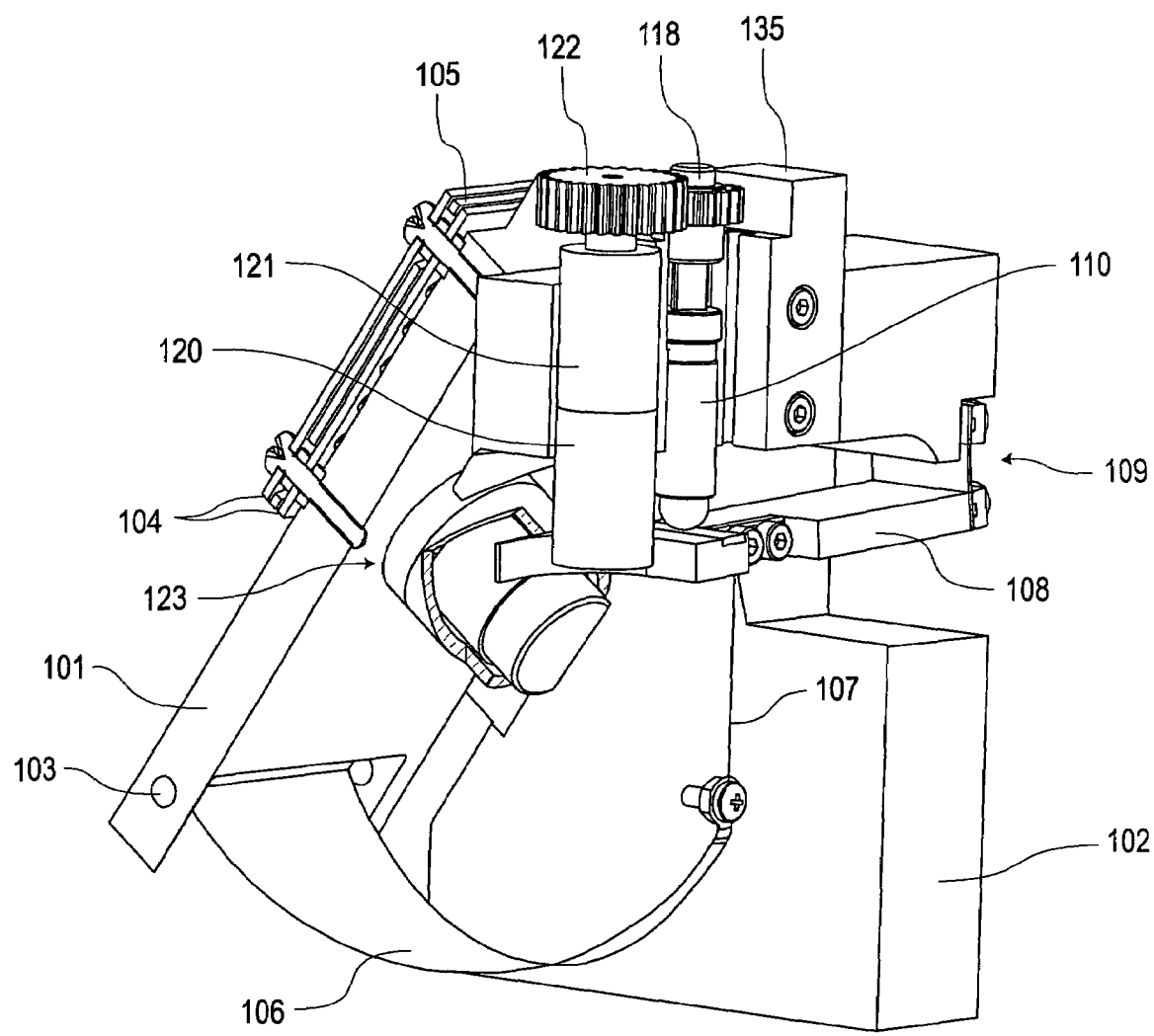
FIG. 1 illustrates a schematic perspective cut-away view of axis mechanics of a seismic sensor incorporating a mass positioning apparatus according to an embodiment of the present invention.

FIG. 1 illustrates axis mechanics including a mass positioning apparatus according to an embodiment of the present invention for use in a seismic sensor. An inertial mass called a boom 101 is attached to a frame 102 by a suspension 103 that permits the boom 101 to pivot as a pendulum without appreciable mechanical friction about the axis of the suspension 103. A capacitive displacement transducer includes two metal plates 104 attached to the boom 101 and a center plate 105 fixed to the frame 102 positioned between the two plates 104. The displacement transducer provides a mechanism for an electronic component (not shown and can be located either internally or externally to the sensor) to detect the position of the boom 101 relative to a null point, defined as the position where the center plate 105 is equidistant from the outer plates 104. A metal boom spring 106 supports the boom 101 to counterbalance the force of gravity and provide a restoring force that returns the boom 101 to the null point is attached at one end to the boom 101 and is suspended at the other end by a wire 107.

A mass positioning apparatus, according to an embodiment of the present invention, includes an adjustment means, an actuator means, and a means for determining position. The means for determining position includes photo-interrupters 140 and 141. The adjustment means comprises of a tensioner arm 108, and a flexure joint 109. The actuator means comprises of an actuator 132, a gear driver 118, a gear 122, a reduction gearbox 121 and a stepper motor 120. The stepper motor 120 is used to adjust the position of the inertial mass of the boom 101 and to center the boom 101 at a null point. This process counteracts the effects of changes in tilt and temperature, as well as to permit the seismometer to be adjusted if for any reason the null position had changed due to shock or other circumstance. Changing the tilt of the sensor (as happens during installation or when adjusting the position of the instrument) changes the direction gravity acts on the boom 101, which causes the boom 101 to move away from the null point. Changes in ambient temperature alter the spring constant of the spring 106 according to the Thermal Elasticity Coefficent (TEC) of the material of the spring 106, and the internal geometry of the axis mechanics can change according to the coefficients of thermal expansion of the various component materials, which together alter the force counterbalancing the boom 101 causing it to move away from the null point. The signal from the displacement transducer is electronically integrated and fed back to the force actuator 123, which compensates for temperature change within a certain operational range, beyond which mechanical adjustment of the mass position is required.

The mass positioning apparatus acts by adjusting the tension of the spring 106 to adjust the position of the boom 101. The mass of the boom 101 is lifted consequent on the tensioner arm 108 rising which pulls the wire 107 thus tensioning the boom spring 106, and correspondingly the mass of the boom is lowered when the tensioner arm 108 moves down.

Figure 2:
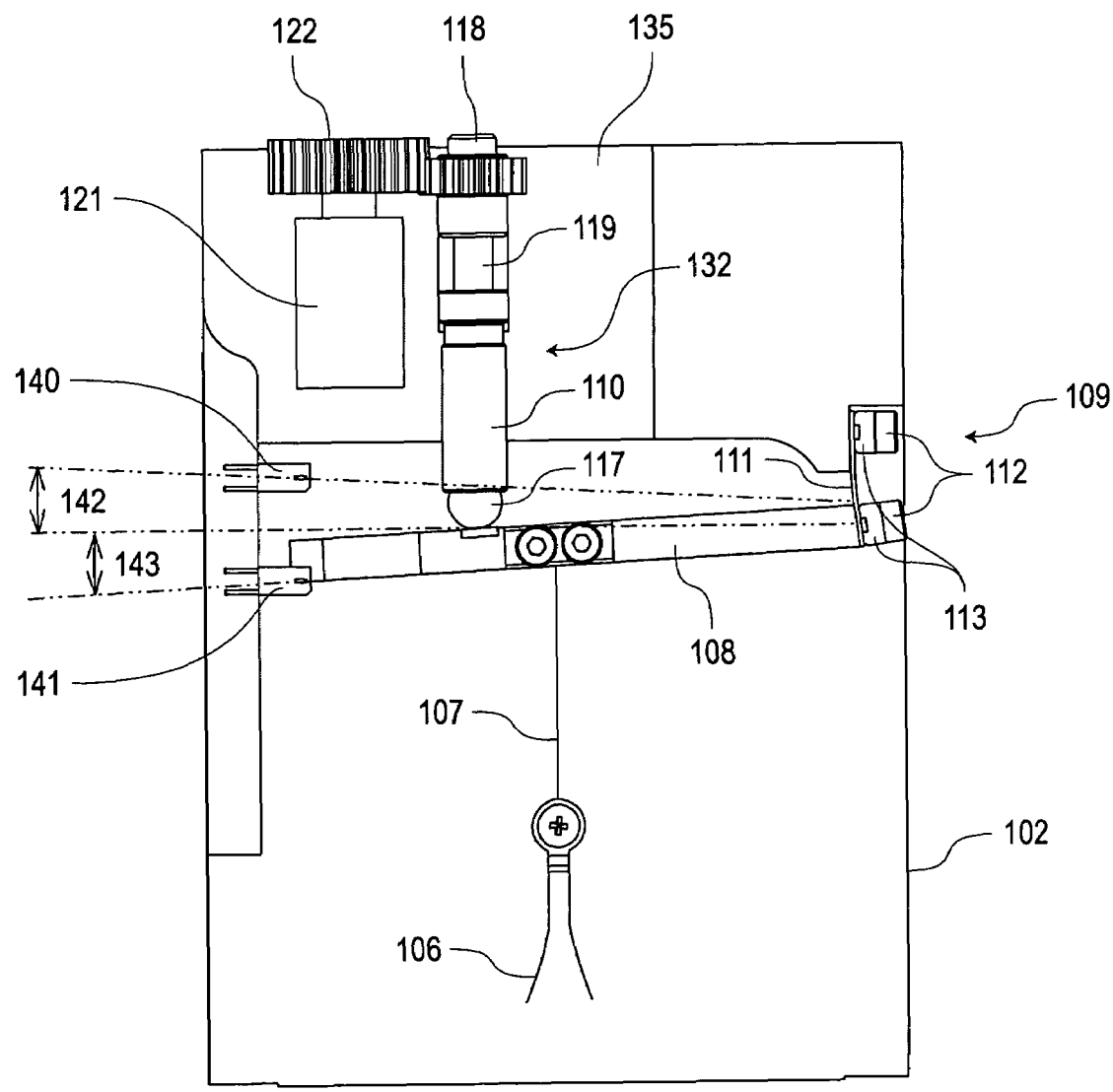
FIG. 2 illustrates a schematic sectioned rear view of the axis mechanics of a seismic sensor showing the mass positioning apparatus of FIG. 1.

FIG. 2 illustrates further details of the mass positioning apparatus according to an embodiment of the present invention. One end of the wire 107 is attached to a tensioner arm 108. The tensioner arm 108 is hinged to the frame 102 by means of a compliant apparatus called a flexure joint 109.

The actuator 132 further comprises of a threaded actuator screw 110 with a flat tab 119 at one end and a sphere 117 glued into a concave cup at the opposite end is threaded into an actuator mounting block 135 which in turn is attached to the frame 102. The actuator 132 moves up or down when rotated and makes contact with the tensioner arm 108 to position the boom 101 by changing the angle of the tensioner arm 108.

In an embodiment of the present invention, the useful range of travel of the tensioner arm 108 is from an angle denoted the upper extent 142 approximately from 3 degrees above the horizontal plane to an angle denoted the lower extent 143 approximately 3 degrees below the horizontal plane, which corresponds to a maximum travel of the wire of approximately 4 mm. Alternate embodiments may have a larger travel range. The leaf hinge 111 is attached to the frame 102 and tensioner arm 108 with screws 112 and backing plates 113 at such angles such that when not otherwise constrained the restoring force of the leaf hinge 111 positions the tensioner arm 108 at an angle above the horizontal plane exceeding the upper extent.

The actuator 132 may be operated manually using a screwdriver, provided an access port be made available in the pressure sealed enclosure to insert the screwdriver. An internal electric motor can be employed to operate the apparatus. A stepper motor 120 is mounted in the actuator mounting block 135 together with an integral reduction gearbox 121 and an external gear 122. The stepper motor 120 is controlled by a microprocessor on the electronic component to rotate the external gear 122 in discrete steps. The external gear 122 engages the gear driver 118 which engages the tab 119 to cause the actuator 132 to rotate and thus raise or lower.

Figure 3:
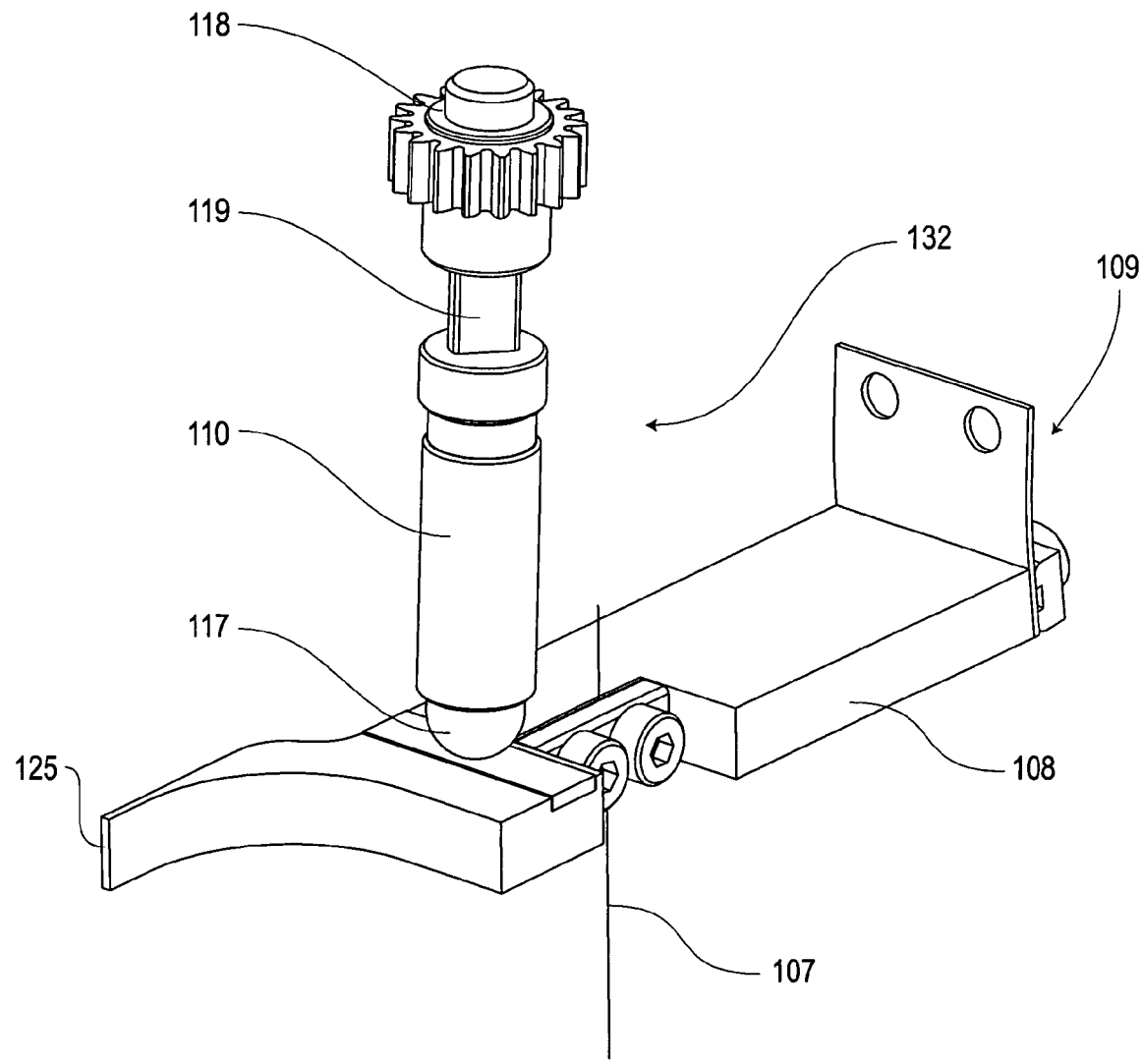
FIG. 3 illustrates a schematic perspective view of a tensioner arm of the mass positioning apparatus shown in FIG. 2 according to an embodiment of the present invention.

Referring to FIG. 3, an integral position sense tab 125 is a machined feature of the tensioner arm 108. Referring to FIG. 2, the position sense tab is oriented so that it activates an optical photo-interrupter 140 when the tensioner arm 108 reaches the upper extent of travel, and interrupts an optical photo-interrupter 141 when the tensioner arm 108 reaches the lower extent of travel. The state of the photo-interrupters 140 and 141 are monitored by the microprocessor of the electronic component during the operation of the stepper motor 120 to ensure the tensioner arm does not transit beyond the upper or lower extents. The function of the photo-interrupters 140 and 141 may be readily implemented using means other than photo-interrupters such as electro-mechanical limit switches activated by the tensioner arm moving to the upper or lower extent of travel.

Figure 4:
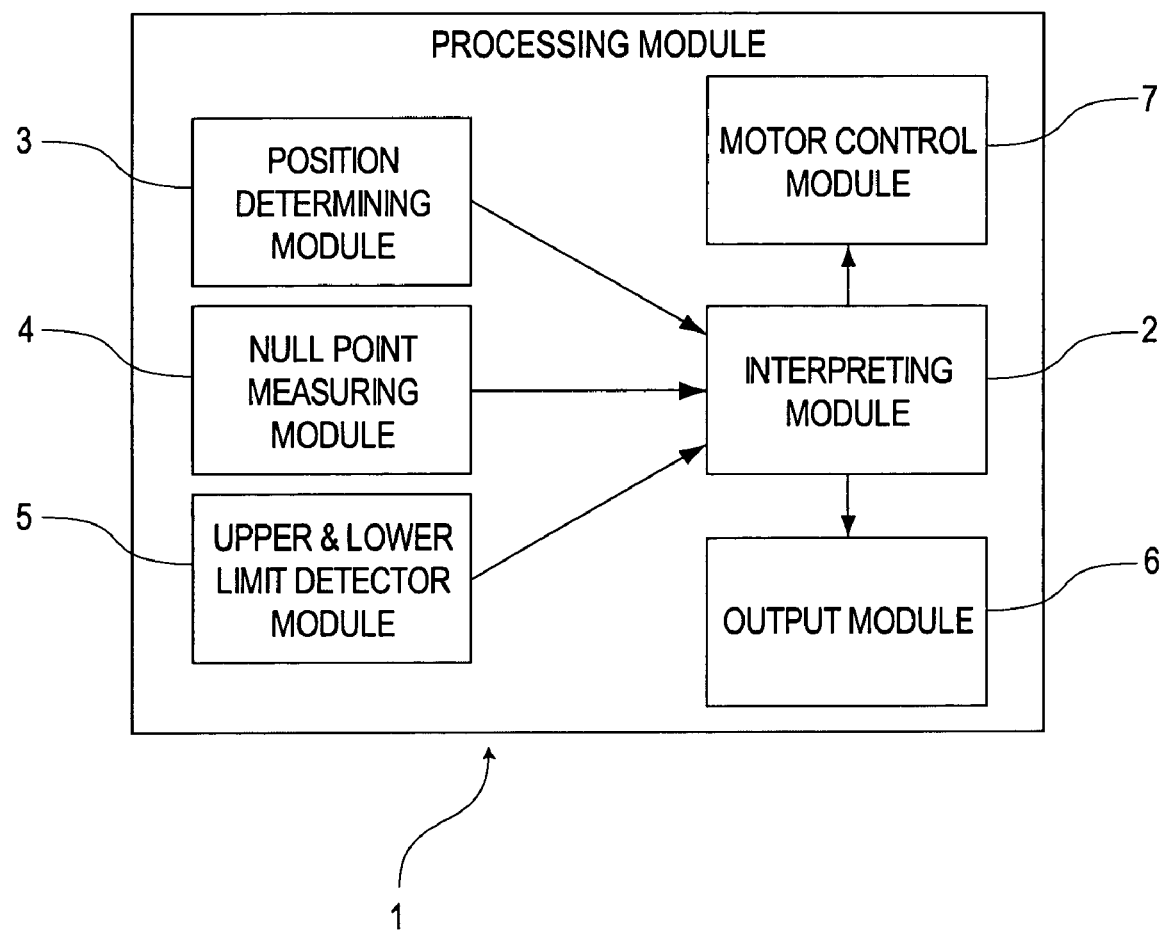
FIG. 4 illustrates a schematic representation of a processing module according to an embodiment of the present invention.

In FIG. 4, a block diagram of a processing module 1 is illustrated. The processing module 1 includes an interpreting module 2, a position determining module 3, a boom null point measuring module 4, a upper and lower limit measuring module 5, a output module 6, and a motor control module 7. The output module 6 includes a means for outputting the parameters such as position to a user. In an embodiment of the present invention, the interpreting module 2 includes a programmed microprocessor. Alternative embodiments may include microcontrollers, programmable logic, processors, analog processors, digital signal processors and the like. The position determining module 3, boom null point measuring module 4 and the upper and lower limit measuring module 5 provide inputs to the interpreting module 2. The motor control module 7 controls an electric motor 120 to move the adjustment means.

In an embodiment, the means for interpreting the data provided by the means for determining the position is a programmed microprocessor. The microprocessor is programmed to when instructed automatically adjust the adjustment assembly which includes a tensioner arm 108 by controlling the actuator assembly which includes stepper motor 120 to reposition the boom 101 at the defined null point. The microprocessor moves the motor 120 in the direction that reduces the output of the capacitive transducer until it is approximately zero while reading the position of the adjustment assembly. If the seismic sensor is later subject to sufficiently large change of tilt or of ambient temperature, the mass position may move to the degree that the electronic component is no longer able to apply sufficient force to keep the boom at its null point. The mass position must then be re-positioned to the null point using the mass positioning apparatus.

The microprocessor of the electronic component is programmed to monitor, store and report the position of the adjustment assembly arm and thus the position of the mass positioning apparatus relative to its useful operational range. Because the photo-interrupters 140 and 141 prevent the stepper motor from moving the mass positioning apparatus to an extreme where it stalls or jams, the position of the adjustment assembly is reliably determined by accumulating the total number of discrete steps made by the stepper motor in the upward direction less the number of discrete steps made by the stepper motor in the downward direction.

The initial position of the tensioner arm is established using a calibration technique as follows: The microprocessor is programmed to perform automatic calibration of the mass positioning apparatus that determines the number of discrete motor steps required for the tensioner arm 108 to transit through the full useful range of travel, and to determine the number of discrete motor steps from the lower extent at which the mass is positioned at the null point for a perfectly level seismic sensor. This information is then stored in non-volatile memory of the electronic component for the operational life of the seismic sensor, until refreshed by repeating the calibration procedure. The seismic sensor is first positioned to be precisely level and the calibration procedure is then initiated. The microprocessor controls the motor 120 to first move the tensioner arm 108 to the lower extent by alternatively moving the motor and monitoring the state of the lower photo-interrupter 141.

The microprocessor then controls the motor 120 to move the tensioner arm 108 to the upper extent monitoring the state of the upper photo-interrupter 140 and counts the number of steps the motor 120 makes to reach the upper extent and sets a quantity called RANGE to this number. The quantity RANGE is stored in non-volatile memory. A quantity called POSITION is set equal to RANGE and stored in non-volatile memory. For each subsequent movement of the motor 120 through the operational life of the seismic sensor, the number of steps moved down is subtracted from POSITION and the number of steps moved up is added to POSITION. Because the motor is moved in discrete steps of fixed angular rotation, the position of the tensioner arm 108 is reliably determined by the quantity POSITION. The boom is then automatically re-positioned to the null point by the microprocessor, and a quantity LEVEL is set to the new quantity POSITION that resulted from this operation and stored in non-volatile memory. The operator of the seismic sensor can thus determine by comparing the quantities RANGE and POSITION whether the mass positioning apparatus is operating close to nominal midpoint or close to the upper or lower extent and take corrective action as needed. The operator can also thus determine by comparing the quantities POSITION and LEVEL for each of the individual axis within the seismic sensor immediately after the automatic mass positioning operation has been completed whether the seismic sensor is nominally level and to what degree and in what orientation the sensor is deflected from true level.

The microprocessor of the electronic component monitors the operational status of the mass positioning apparatus to identify abnormal conditions including the condition of a stuck mass positioning apparatus and the condition of excessive tilt of the seismic sensor. In an embodiment of the present invention, the microprocessor determines the condition of a stuck apparatus exists when it controls the motor to move by a number of steps in one direction that exceeds the quantity RANGE by a fixed margin of error without activating either of photo-interruptors 140 and 141. The microprocessor determines the condition of excessive tilt of the seismic sensor exists when either of photo-interruptors 140 and 141 is activated when attempting to position the boom 101 at the null point.

An example interpreting module has the following inputs:
  Adjustment means position—from a position transducer or stepper motor
  Upper Limit Switch State—from an upper limit switch
  Lower Limit Switch State—from a lower limit switch
  Boom Position—from the displacement transducer When the means for determining position includes a position transducer (such as linear position transducer, rotational position transducer, proximity detector, linear displacement transducer, rotational displacement transducer, gap measuring transducer, contact switch), the position can be read directly from the position transducer. Alternatively, the means for determining position can be derived from counting steps of the stepper motor.

During a calibration state, the interpreting module determines and stores the following parameters:

---

Cal upper Limit = adjustment means position when the upper limit switch is on
Cal lower Limit = adjustment means position when the lower limit switch is on
Cal Range = Cal upper Limit − Cal lower Limit
Cal Level = adjustment means position when boom is at the null point

---

During an operational state, the interpreting module determines the conditions of stuck mass position apparatus or excessive tilt as follows:

---

While adjustment means moving up
  If ((adjustment position > cal upper limit) and the upper limit switch not on)
    Then mass positioning apparatus is stuck
While adjustment means moving down
  If ((adjustment position > cal lower limit) and the lower limit switch not on)
    Then mass positioning apparatus is stuck
If there is no null point of the boom in the adjustment cal range then there is excessive tilt

---

After the interpreting module has found the null point of the boom, the interpreting module can determine the tilt of the axis mechanics by comparing the cal level to the current position of the adjustment means:

Tilt=cal level−current position

This tilt can be calculated in degrees based on the geometry of the axis mechanics.

Alternative embodiments of the present invention include apparatuses that report the position of the mass position apparatus relative to its operational range as follows: (a) employ a linear position transducer attached at one end to the tensioner arm 108 and at the other end to a fixed point on the frame 102 that provides an analogue or digital output signal proportional to distance, and in which this output signal is measured by the microprocessor of the electronic component; and (b) a rotary position transducer integral to or geared to any of the rotating components such as the motor 120, reduction gearbox 121, gear 122, gear driver 118, actuator 132 or other like.

The mass position may be adjusted by alternative mechanisms for adjusting the boom spring tension, in which the use of a position detecting means is employed according to alternative embodiments can include: (a) an apparatus that adjusts the tilt of the axis mechanics to change the direction gravity is acting and thereby adjust the position of the mass relative to the null point; (b) an apparatus that adjusts a counterweight on the boom 101 to change the center of mass of the boom causing the boom 101 to move to the null point; and (c) adjusting the mass position relative to the null point. The use of a position detecting means with alternative apparatuses for positioning the mass provides similar benefits as has been described above in connection with other embodiments of the present invention.

Although the various aspects of the present invention have been described in terms of particular embodiments and applications one of ordinary skill in the art, in light of this teaching, can generate additional embodiments and modifications without departing from the spirit of or exceeding the scope of the claimed invention. Accordingly, it is to be understood that the drawings and descriptions herein are proper by way of example to facilitate comprehension of the invention and should not be construed to limit the scope thereof.

The invention claimed is:

1. A mass positioning apparatus for use in a seismic sensor having axis mechanics including a pivotable boom with a defined null point, the apparatus comprising:
  adjustment means for positioning the boom at the null point;
  actuator means for moving the adjustment means; and
  means for determining a position of the adjustment means relative to an operational range of travel.

2. The apparatus of claim 1, wherein the means for determining includes a position transducer.

3. The apparatus of claim 2, wherein the position transducer is selected from the group consisting of: linear position transducer, rotational position transducer, proximity detector, linear displacement transducer, rotational displacement transducer, gap measuring transducer, contact switch.

4. The apparatus of claim 2, wherein the position transducer includes a first position detector for detecting that the adjustment means has moved to a defined lower travel limit and a second position detector for detecting that the adjustment means has moved to a defined upper travel limit.

5. The apparatus of claim 4, wherein the position transducer includes optical means to detect position.

6. The apparatus of claim 1, wherein the actuator means includes an electric motor.

7. The apparatus of claim 6, wherein the electric motor is a stepper motor.

8. The apparatus of claim 7, further comprising means for accumulating and storing a number of steps the stepper motor moves.

9. The apparatus of claim 6, further comprising means for controlling the electric motor to prevent the adjustment means from moving beyond the defined lower travel limit and the defined upper travel limit.

10. The apparatus of claim 1, further comprising means for interpreting the determined position of the adjustment means to determine operational status parameters of the axis mechanics and the seismic sensor.

11. The apparatus of claim 10, wherein the means for interpreting includes means for determining and storing the operational range of travel of the adjustment means.

12. The apparatus of claim 10, wherein the means for interpreting includes means for determining and storing a nominal position of the adjustment means for positioning the boom at the null point for the seismic sensor when approximately level with respect to a horizontal plane.

13. The apparatus of claim 10, wherein the means for interpreting includes means for determining a condition of a stuck adjustment assembly.

14. The apparatus of claim 10, wherein the means for interpreting includes means for determining a condition of excessive tilt of the seismic sensor.

15. The apparatus of claim 10, wherein the means for interpreting includes means for determining a degree of tilt of the axis mechanics from an initial nominal value.

16. The apparatus of claim 10, wherein the means for interpreting includes means for determining a degree and direction of tilt of the seismic sensor from an initial nominal values.

17. The apparatus of claim 4, wherein the adjustment means includes a tensioner arm pivotably mounted to the axis mechanics, the tensioner arm including an integral protrusion for activating the first position detector and the second position detector.

18. The apparatus of claim 11, wherein the means for interpreting includes a device selected from the group consisting of microprocessor, microcontroller, processor, programmable logic, digital signal processor, and analog processor.

* * * * *